United States Patent
Svejkovsky et al.

(10) Patent No.: US 6,527,104 B2
(45) Date of Patent: Mar. 4, 2003

(54) DIFFERENTIAL IMPULSE CONVEYOR WITH LINEAR MOTOR DRIVE

(76) Inventors: Paul B. Svejkovsky, 901 Falcon La., Coppell, TX (US) 75019; Paul A. Svejkovsky, Rte. 2, Box 338-A, Marquez, TX (US) 77865; Thomas G. Knodell, Jr., 5425 Yellowstone Trail, Fort Worth, TX (US) 76137

( * ) Notice: Subject to any disclaimer, the term of this patent is extended or adjusted under 35 U.S.C. 154(b) by 209 days.

(21) Appl. No.: 09/788,153

(22) Filed: Feb. 16, 2001

(65) Prior Publication Data
US 2001/0007300 A1 Jul. 12, 2001

Related U.S. Application Data

(62) Division of application No. 09/215,582, filed on Dec. 17, 1998, now Pat. No. 6,189,683.

(51) Int. Cl.[7] .............................................. B65G 27/24
(52) U.S. Cl. ........................ 198/769; 198/766; 198/770; 198/764
(58) Field of Search ...................... 198/750.1, 750.7, 198/763, 764, 766, 769, 770

(56) References Cited

U.S. PATENT DOCUMENTS

| | | | |
|---|---|---|---|
| 3,276,307 A | * 10/1966 | Williamson | 198/769 |
| 3,581,871 A | * 6/1971 | Forman | 198/220 |
| 4,356,911 A | * 11/1982 | Brown | 198/769 |
| 5,351,807 A | * 10/1994 | Svejkovsky | 198/750 |
| 5,409,101 A | * 4/1995 | Ahmed et al. | 198/750 |
| 5,794,757 A | * 8/1998 | Svejkovsky et al. | 198/750.1 |
| 5,842,678 A | 12/1998 | Svejkovsky | |
| 6,105,753 A | * 8/2000 | Graham | 198/763 |
| 6,189,683 B1 | * 2/2001 | Svejkovsky | 198/769 |
| 6,237,748 B1 | * 5/2001 | Kroger | 198/763 |

* cited by examiner

Primary Examiner—Douglas Hess
(74) Attorney, Agent, or Firm—Loren G. Helmreich (57) ABSTRACT

A differential impulse conveyor includes a conveyor base 12 and a tray 16 movable in a forward direction to move goods with the tray and in a backward direction to slide goods along the tray. A pair of tray support members 18, 20, 192, 200, 222 interconnect the conveyor base in the tray. Each tray support member may be pivotally connected at a lower end of the conveyor base and pivotally connected at an upper end of the tray. An electrically powered linear motor 30, 82, 95, 135, 145, 225 moves the tray forward and rearward. A connector support 20 for interconnecting the base and the tray, or for interconnecting any stationary member and a movable member, may include a linear bearing having an end surface with a radius for rolling engagement with a contact surface having a radius twice of that of the end surface to achieve the desired linear motion of the tray or movable member.

25 Claims, 7 Drawing Sheets

DIFFERENTIAL IMPULSE CONVEYOR WITH LINEAR MOTOR DRIVE

This application is a division of application Ser. No. 09/215,582, filed Dec. 17, 1998, now U.S. Pat. No. 6,189,683.

FIELD OF THE INVENTION

The present invention relates to a differential impulse conveyor for moving goods along a conveyor tray. More particularly, this invention relates to an improved drive mechanism which utilizes an electrically powered linear motor for powering movement of the differential impulse conveyor tray with respect to a conveyor base. A related invention involves a linear connector for interconnecting a stationary member and a movable member, with the connector being pivotally connected to one of the members. The connector includes a linear bearing for achieving straight line motion rather than arcuate motion of the movable member.

BACKGROUND OF THE INVENTION

Various types of conveyors are available which each employ an elongate, slightly downwardly inclined tray or pan having a planar surface for transporting goods thereon. These types of conveyors are preferred in various industries since the goods being transported along the tray need only engage a unitary tray during the conveying operation, and since the tray may be easily cleaned. Conveyors of this type have been used for decades and include those commonly referred to as reciprocating conveyors, shaker conveyors, or vibratory conveyors.

Differential impulse conveyors may also use a slightly downwardly inclined tray, but alternatively may use a horizontal tray or slightly upwardly inclined tray. Differential impulse conveyors, which are sometimes referred to as linear motion conveyors, are operationally distinguishable from vibratory conveyors because the tray is moved slowly forward to convey the goods with respect to the tray, and then is moved rearward at a high return speed so that the goods slide along the tray, thereby effectively transporting the goods along the conveyor tray. A significant advantage of differential impulse conveyors is that these conveyors do not tend to damage fragile goods. Moreover, a differential impulse conveyor does not require gravity to move goods along the tray, and accordingly the tray supporting surface may be horizontal or may even be inclined upwardly. Accordingly, differential impulse conveyors have gained increased acceptance in recent years.

The drive mechanism for a differential impulse conveyor generates repeated acceleration and deceleration of the tray. Since the forward acceleration is less than the rearward acceleration, the goods move with the tray when the tray moves forward, and slide with respect to the tray when the tray moves rearward. Early types of drive mechanisms for achieving this motion in a differential impulse conveyor included a plurality of weights which were moved back and forth to obtain the desired movement of the tray. These inertia drive systems impart high loads to the conveyor support structure or base, and thus typically require a heavy and expensive support structure for the conveyor. These inertia drive systems undesirably require a fair amount of startup time before the motor driving the weights causes the tray to move in its desired manner, and similarly result in tray movement for a period of time after the drive motor is deenergized. Also, these inertia drive mechanisms are costly and complicated, and frequently have high maintenance costs.

Another type of drive mechanism for powering a differential impulse conveyor utilizes a power source which cooperates with mechanical components which directly move the tray. One such arrangement, as disclosed in U.S. Pat. No. 5,351,807, employs an angled universal drive and a speed reducer to achieve the desired tray movement. Other drive systems for powering a differential impulse conveyor are disclosed in U.S. Pat. No. 5,794,757. One drive mechanism recently introduced to the marketplace employs a plurality of eccentrically mounted pulleys. A crank arm interconnects one of the pulleys and a tray support arm to drive the conveyor tray slowly forward and then quickly backward. The systems disclosed in the above two patents have significant advantages over inertia drive systems for powering a differential impulse conveyor. These drive systems have the ability to substantially instantaneously achieve the desired tray motion when the drive unit is started, and similarly instantaneously stop the tray motion when the drive unit is stopped. This is a significant advantage of these drive units compared to the inertia drive mechanisms, and allows the differential impulse conveyor to be reliably used for cross-feed applications. The size and expense of these latter described drive systems, as well as the number of moving parts, nevertheless restricts the acceptability of differential impulse conveyors, particularly in applications wherein the size and cost of the drive system are significant factors to the customer.

The disadvantages of the prior art are overcome by the present invention. An improved differential impulse conveyor with a linear drive mechanism is hereinafter disclosed. The drive mechanism has few moving parts, and in many applications requires less space and cost than other drive mechanisms. An improved connector is also disclosed for pivotally interconnecting a stationary member and a member movable with respect to the stationary member such that the movable member reciprocates in a straight line path rather than in an arcuate path.

SUMMARY OF THE INVENTION

A differential impulse conveyor includes a tray movable in a forward direction to move with the goods and in a backward direction to slide goods along the tray. An electrically powered linear motor moves the tray in the forward direction and in the backward direction. The linear motor has an armature linearly movable with respect to a stator in a reciprocating manner to move the tray. A pair of tray support arms interconnect a conveyor base and the tray. The armature of the linear motor may be connected to either one of the tray support arms or directly to the tray.

In a preferred embodiment of the invention, each tray support member is pivotally connected to a lower end to the conveyor base and is pivotally connected at an upper end to the tray. The electrically powered motor stator may have a plate-like configuration, and the armature may have a similar configuration. Electrical power supplied to the motor thus linearly moves the armature with respect to the stator, and thereby moves the tray with respect to the base. For differential impulse conveyors with relatively large trays, a counterweight may be provided movable in a backward direction during forward movement of the tray and in a forward direction during backward movement of the tray.

A connector for interconnecting a stationary member and a movable member linearly movable in a straight line path is also provided. A pivot at one end of the connector is connected to one of the stationary and movable members. A specially designed curved end surface on the connector and a specially designed curved contact surface on the other of the stationary and movable member result in rolling engagement of engaging curved surfaces to result in straight line travel of the movable member.

It is an object of the present invention to provide an improved differential impulse conveyor utilizing an electrically powered linear motor to move the tray in a forward direction and in a backward direction. A related object of the invention is to increase the acceptability of differential impulse conveyors in various applications by providing a conveyor drive mechanism which is highly reliable and has a relatively low cost.

It is an object of a related invention to provide a connector for interconnecting a stationary member and a movable member, with the connector being pivotally connected at one end to one of the stationary member and movable member. The opposing end of the connector has a curved end surface with a radius positioned along the pivot axis. A curved contact surface is provided on the other of the stationary member and the movable member, which contact surface has a radius twice that of the end surface. This curved contact surface engages the curved end surface to provide for linear motion of the movable member with respect to the stationary member.

It is a feature of the invention to provide a controller for regulating the linear drive motor of a differential impulse conveyor, such that the cycle rate of the linear motor is controlled to regulate the travel speed of the product moving along the reciprocating tray. Another feature of the present invention is that the linear motor conveyor is well adapted for use to drive a differential impulse conveyor tray forward and backward, with the tray being supported on a pair of arms pivotally connected to the conveyor tray. High reliability for the conveyor may be enhanced by eliminating or at least substantially reducing the number of linear bearings which guide tray movement with respect to the base in both the forward and backward directions.

Another significant feature of this invention is that the number of movable parts required to drive the tray of a differential impulse conveyor may be reduced compared to prior art drive mechanisms. Both the size and the cost of the drive system for powering the differential impulse conveyor may also be reduced, thereby significantly increasing the applications in which a differential impulse conveyor is a preferred type of transport system for the goods.

Yet another feature of the invention is that differential impulse conveyor may include a pair of supports each forming an improved linear bearing with a specially designed contact surface in the base of the conveyor, such that each support may be pivotally connected to the tray while the axis of this pivotal connection remains at the same elevation during the forward and rearward movement of the tray.

An advantage of the present invention is that another linear drive motor may be used to power a counterweight which opposes movement of the tray. Alternatively, a linkage mechanism may be provided so that the counterweight and the tray are driven by the same linear motor, with a counterweight moving in the opposite direction of the tray.

Yet another advantage of this invention is that the linear motor drive system is able to substantially immediately obtain the desired motion of the conveyor tray upon activation of the linear motor, and similarly stops tray motion substantially immediately upon deactivation of the linear motor, such that the conveyor is well suited for various applications.

Another significant advantage of the present invention is that the cost of linear motors is relatively low. The selected linear motor may either utilize permanent magnets or an electrical coil or winding on both the stator and the armature. A linear motor with a stator coil encircling an armature may be used. Alternatively, a linear motor may have either a flat plate stator and a flat plate armature, or a curved plate stator and a curved plate armature.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
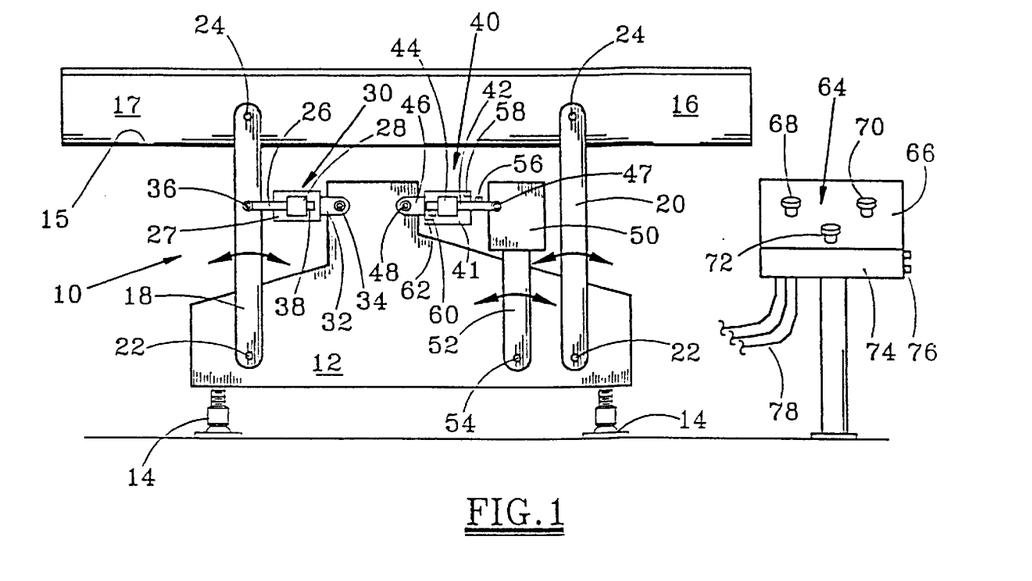
FIG. 1 is a side view of one embodiment of the differential impulse conveyor according to the present invention utilizing linear motors with an armature circumferentially encircling a reciprocating shaft.

FIG. 1 depicts one embodiment of a differential impulse conveyor 10 according to the present invention powered by a linear motor 30. The differential impulse conveyor includes a base 12, which is schematically shown in FIG. 1 as being secured to the floor by a plurality of machine feet 14, each of which is selectively adjustable so that a base 12 may be precisely leveled and, if desired, the inclination of the pan 16 supported on the base may be altered. Each of the machine feet 14 may have various configurations, and for applications wherein the differential impulse conveyor is used in the food processing industry, each machine foot 14 may be of the type shown in U.S. Pat. No. 5,842,678.

The pan 16 is of a conventional type used on differential impulse conveyors, and includes a tray floor 15 for supporting the goods being moved along the tray and a pair of tray sides 17. As shown in FIG. 1, forward movement of the goods is to the right, and thus the tray 16 moves forward to move goods in that direction, then the tray more quickly moves backward so that the goods slide along the tray, thereby effectively moving the goods forward with respect to the reciprocating tray. Those skilled in the art will appreciate that the forward and backward cycle of the tray ideally occurs rapidly for most applications, and typically is in the range of from 100 to 250 cycles per minute. Maximum travel rate for the product is typically achieved at cycle rates of about 200 cycles per minute.

As shown in FIG. 1, the tray 16 is supported by tray support members 18 and 20. For the type of tray support members shown in FIG. 1, at least two such support members are necessary, although in a preferred embodiment a rearward left-side and a rearward right-side tray support member 18 are provided, and a forward left-side and a forward right-side tray support member 20 are also provided. Less desirably, a rearward support under the conveyor tray and centrally located between the sides of the tray 16 and another similarly located forward support member could be used. Each of the tray support members 18 and 20 is pivotally connected at this lower end to the base 12 so that each tray support member pivots about a respective axis 22. Each tray support member is similarly pivotally connected to the tray 16, and ideally to either a left-side wall or right-side wall of the tray so that it pivots about an axis 24 with respect to the tray 16. The forward and backward movement of the tray 16 is typically 2 inches or less, and in most applications is from about 1.5 inches to 2 inches. Accordingly, it should be understood that the angle of pivotal movement of each of the tray support members with respect to the base 12 about the axis 22 is very slight, and similarly the angular member of each tray support member with respect to the reciprocating pan 16 about axis 24 is slight.

The electrically powered linear motor 30 shown in FIG. 1 includes a stator 27 which is secured to the base 12, and a reciprocating armature 26 which, for the embodiment shown in FIG. 1, is secured to one of the tray support arms or members 18. The opposing end 38 of the armature thus reciprocates within the stator 27. In a preferred embodiment, it should be understood that a cross member (not shown) may interconnect the left-side and right-side rearward tray support arms 18, so that the armature 26 is pivotally interconnected to the cross member, which in turn is then fixedly connected at each end to a respective one of the tray support members 18. Each of the linear motors disclosed herein has the desired capability of instantaneously starting and stopping the tray movement at its desired speed, thus allowing the conveyors to be reliably used for cross-feed applications.

The electrically powered motor 30 includes an electrically energized coil of insulated wire 28 which produces a magnetic field within the coil. The magnetic field produced by the coil 28 may be used to magnetize and thus attract the plunger or armature 26 to a position within the coil and, in a commercial embodiment, the motor may include two such coils each of which attract a respective portion of the armature 26. Electricity to each of the coils may be alternated, so that this action produces the linear reciprocation of the armature 26. The round linear motor 30 thus may functionally be equivalent to a pair of in-line solenoids arranged to reciprocate a plunger or armature 26. In an alternate embodiment, one or more electrical coils may also be provided on the armature, in which case the motor 30 closely resembles a conventional electric motor which outputs a rotary shaft, but in this case the motor 30 outputs linear reciprocating motion of the armature or plunger 26. It should be understood that the terms "stator" and "armature" as used herein are broadly defined to refer to the stationary component and the movable component of a linear motor. For the embodiment shown in FIG. 1, the linear motor is a simple "round" linear motor with one moving part, namely the armature 26, and typically includes at least a pair of internal linear bearing to guide the linear movement of the armature. The motor 30 may also include position sensors so that the actuation of the coils may be properly timed or sequenced. A suitable round linear motor is commercially available from various manufacturers, including California Linear Devices, Inc. A particular advantage of the round linear motor 30 as shown in FIG. 1 is that the coils circumferentially surround the armature 26 which passes through the center of each coil, thereby eliminating or at least substantially reducing forces acting on the armature which are not linear, i.e., which are not aligned with the central axis of the armature 26.

Even though the angular movement of the tray support arm 26 with respect to the base 12 is slight during operation of the motor 30, the linear bearings in the motor 30 would be destroyed quickly if the motor stator were rigidly secured to the base 12 and the motor armature were rigidly secured to the support 18. Accordingly, the motor stator 27 is secured to stator support 32, which in turn is pivotally secured to the base 12 to rotate about pivot axis 34. The pivotal connection between the support 32 and the base may take various forms, such as a conventional clevis arrangement. Similarly, the end of the armature 26 is pivotally connected to the tray support 18 or to the cross member (not shown) between the pair of tray supports 18 so that a pivotal connection about axis 36 is provided. The pivotal connection at each end of the motor 30 to the base and the tray support member 18 thus allow the armature 26 to move in a linear manner even though the tray support member 18 is pivoting back and forth about the axis 22.

The pivotal connection between the base 12 and the support member 18, and between the support member 18 the tray 16, may be obtained using commercially available rubber bushings. Suitable bushing for this application is available from Great Lakes Bushings, Inc. in Kenosha, Wis., Model Nos. GL 030 or GL-1. This type of bushing at the ends of each tray support member provide very low wear and very high reliability, which is very important in this application in view of the high number of forward and backward cycles of the tray 16.

The cycle of the linear motor may be regulated by a controller 74, which in turn may receive signals from position sensors on the motor. Controller 74 thus outputs electrical power via lines 78 to the coils in the motor 30. A control station 64 may be provided with various controls for regulating the cycle of the motor. A control adjustment knob 68 may thus be used to control the power to one coil in the motor and thus control the forward speed and the forward acceleration of the tray 16. A similar adjustment knob 70 may be used to control the electrical power to another coil and thereby regulate the velocity and acceleration of the tray 16 during the return or backward movement of the tray 16. For a tray of a given weight, it is envisioned that each of these forward acceleration and backward acceleration curves may be optimized with the controller to produce the desired velocity or acceleration curve, as discussed more fully in U.S. Pat. No. 5,794,757. A graph plotting the forward and rearward velocity of the conveyor may thus illustrate a sinusoidal motion that provides a relatively slow forward and fast backward movement, with the backward velocity being approximately 2.6 times the maximum forward velocity in order to provide travel rates of goods along the conveyor at speeds of up to 40 feet per minute. A preferred velocity curve for a given tray may also be maximized for a specific tray inclination since, as previously noted, the differential impulse conveyor of the present invention may be used to reliably convey goods along the tray regardless of whether the tray 16 is angled slightly downwardly, is horizontal, or is angled slightly upwardly.

Another control knob 72 is provided for regulating the cycle time of the forward and reverse motions of the conveyor, and thereby regulates the velocity of the goods as they move forward with respect to the reciprocating tray 16. Accordingly, the user may adjust the speed of the goods moving along the tray by regulating the knob 72, with the adjustment knob 68 and 70 remain unchanged. Computer outlets 76 may be provided so that a portable computer controlled by a conventional keyboard may input or retrieve data stored in the controller, and may alter the operation of the controller 74 in response to operator signals. The controller 74 may thus control electrical power along lines 78 which drive the motors 30 and 40. It should be understood that the operator control station 64 as shown in FIG. 1 includes a control panel 66 which is structurally independent of the base 12 of the differential impulse conveyor. In many applications, the controller 74 as well as the adjustment devices 68, 70, and 72 may be mounted on a panel 66 which is directly supported by base 12 of the conveyor. For a differential impulse conveyor with a pan which is relatively small and thus lightweight, a counterweight need not be provided to offset the motion of the tray 16 in order for the differential impulse conveyor to have a long life. For applications wherein the pan weight is in excess of approximately 20 pounds, however, generally it is desired to provide a counterweight which moves backward during forward motion of the tray, and similarly moves forward during backward motion of the trays, thereby reducing the net forces acting on the base and ensuring the smooth running operation for the conveyor. As shown in FIG. 1, the counterweight 50 is thus optionally provided on a support 52 which is pivotally connected at 54 to the base 12. Another linear motor 40 similar to the linear motor 30 previously described is provided for powering the counterweight, with this motor 40 being controlled in the same manner as motor 30. This linear motor 40 thus includes a stator 41 which is fixedly secured to support 46, which is pivotally connected to the base 12 at 48. The armature 42 extends through one or more coils 44, with the extending end of the armature being connected to the counterweight 50 to pivot about pivot axis 47. FIG. 1 also conceptually illustrates a triggering device 56 mounted on the armature 42 and a position sensor 58 mounted on the stator 41 to output a signal in response to the position of the armature. The opposing end of the armature may include a similar triggering device 60 and another position sensor 62. The position sensors 58 and 62 may thus output signals to the controller 74 to assist in regulating operation of the motor 40. Hall effect transducers may be suitable position sensors for sensing the position of the armature with respect to the stator. Although not shown in FIG. 1, it is understood that the linear motor 30 may similarly include such position sensors, which either may be integral in the linear motor as manufactured, or may be added as an extra feature to a linear motor.

Movement of the counterweight 50 in response to motor 40 thus effectively eliminates or at least substantially reduces the vibration in the differential impulse conveyor which otherwise would occur due to the rapid acceleration and deceleration of a heavy pan 16. Another rubber bushing of the type previously described preferably is used to pivotally mount the counterweight support 52 with respect to the base 12.

A significant advantage of a differential impulse conveyor as shown in FIG. 1, and as discussed in many of the following embodiments, is that the tray or pan is supported with respect to the base without the use of linear bearings. The use of rubber bushings rather than linear bearings contributes to the long life of the conveyor, and significantly reduces the conveyor maintenance costs. One of the disadvantages of the embodiment shown in FIG. 1 is that linear bearings, although not depicted, are provided within the motors 30 and 40 to guide movement of the armature with respect to the stator. The operation of a conventional linear motor is such that these internal bearings may have a suitable life in many linear motor applications, since these linear motor bearings are generally intended for use over approximately 100 million inches of travel of the armature with respect to the stator. When used in a differential impulse conveyor, however, this high linear travel may be obtained in 8 to 10 months of conveyor life, which in many applications is unacceptable.

Figure 2:
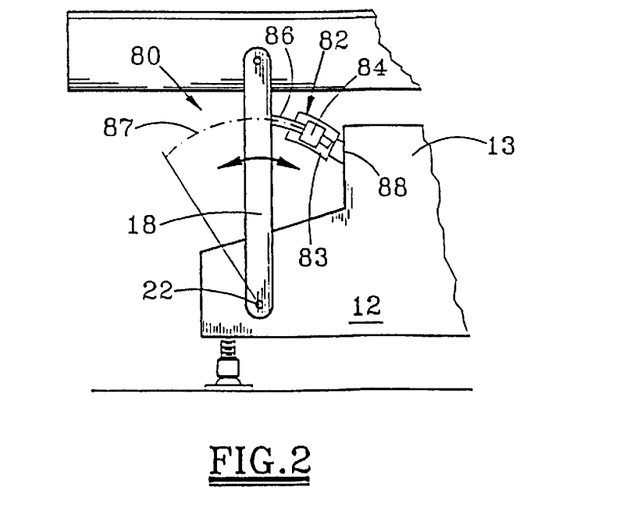
FIG. 2 is a side view of a alternate embodiment of a conveyor similar to the conveyor shown in FIG. 1 but modified such that the linear motor includes a curved shaft which reciprocates in an arc along the shaft centerline.

FIG. 2 depicts a portion of a differential impulse conveyor 80 which is similar to the embodiment shown in FIG. 1. Accordingly, only those portions which distinguish FIG. 2 from FIG. 1 are discussed below. In the FIG. 2 embodiment, tray support arm 18 is reciprocated by a linear motor 82 which includes a stator 83 housing one or more coils 84 and an armature 86. Rather than having a straight axis, the armature 86 has a curved axis 87, with the radius of curvature being such that its center is substantially along the pivot axis 22. The base 12 as shown in FIG. 2 includes a rigid support 13, and the stator 83 is rigidly fixed to the rigid support 13 by a connecting bracket 88. The curved armature 86 similarly may be rigidly secured to the tray support member 18 or to the cross member which interconnects the left-side and right-side tray support members. The curvature of the armature 86 is thus controlled so that neither the stator nor the armature need be pivotally connected to the base and the tray support, respectively. For this application, linear bearings otherwise conventionally provided in a round linear motor may thus be eliminated or, if such linear bearings are provided, their life is significantly increased since the axis of the armature is otherwise fixed relative to the stator. The embodiment as shown in FIG. 2 may thus have the advantage of a longer life compared to the embodiment as shown in FIG. 1. The FIG. 2 embodiment may also eliminate the pivotal connection of the round linear motor with the base and the tray support member, although if desired a pivotal connection may still be made for purposes of alignment, at which time the position may be locked in place. The embodiment as shown in FIG. 2 has the same advantage of the embodiment shown in FIG. 1, in that the round motor produces no significant forces on the armature other than the desired linear motion forces which result in reciprocating movement of the armature with respect to the stator. For the FIG. 2 embodiment, this reciprocating motion of the armature with respect to the stator is still linear, although in this case the linear motion is along a curved or arced path rather than in a straight line. In the FIG. 2 embodiment, it should be understood that a counterweight and another linear motor similar to motor 82 for separately driving the counterweight may be provided, although the additional motor and the counterweight are not depicted in FIG. 2 since its operation will be understood by those skilled in the art in view of the disclosure in FIG. 1. Also, it should be understood that in FIG. 2, as well as in the remaining figures discussed subsequently, the same reference numerals are used to describe components which functionally are similar to components previously described. Also, FIG. 2 and the remaining figures discussed subsequently depict the conveyor leveling feet 14 shown in FIG. 1. Such leveling feet are preferable, but may not be required.

Figure 3:
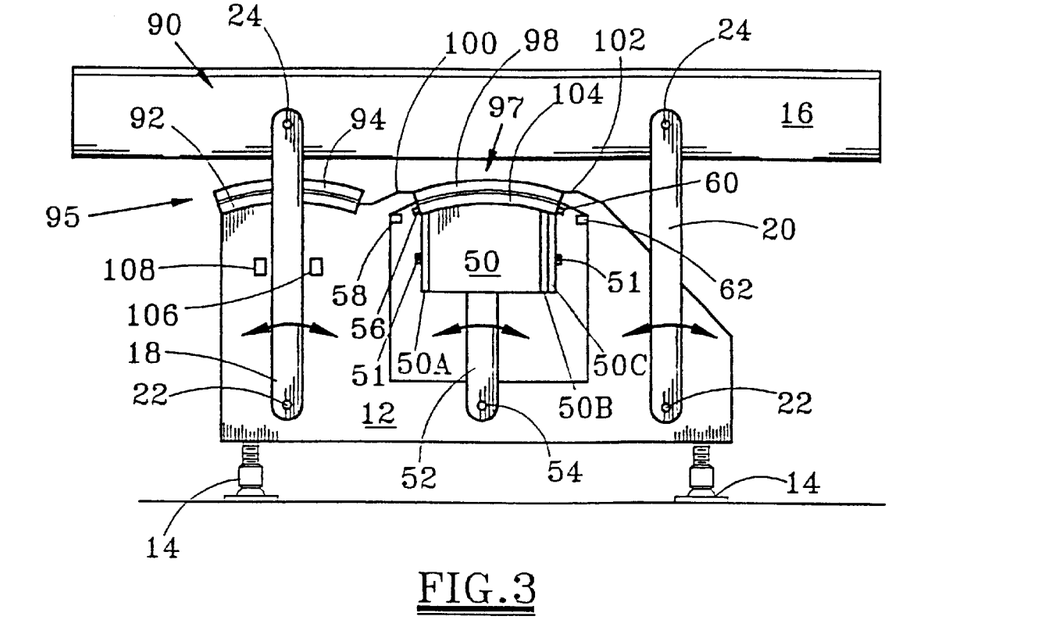
FIG. 3 is a side view of another embodiment of a differential impulse conveyor utilizing a linear motor having a curved plate armature and a curved plate stator.
Figure 4:
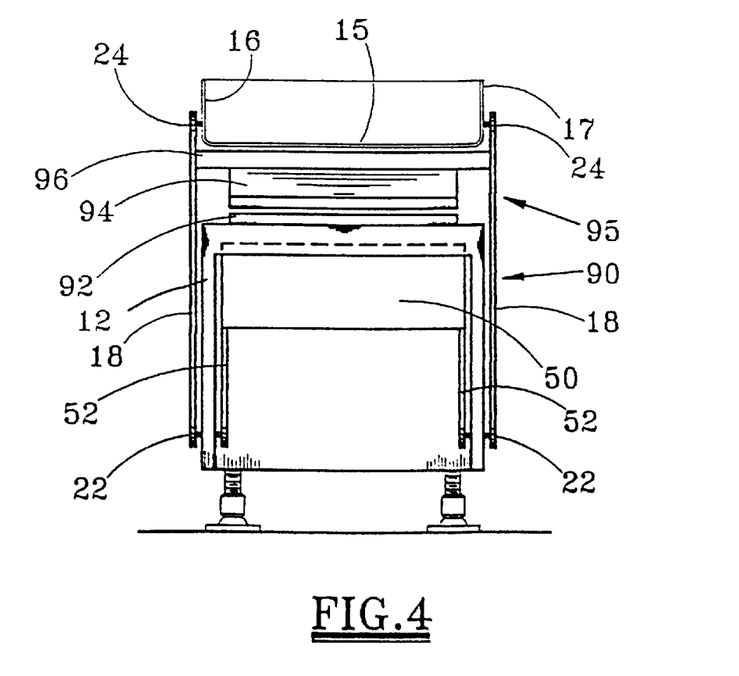
FIG. 4 is a left end view of the embodiment shown in FIG. 3.

FIGS. 3 and 4 depict an alternate embodiment of a linear motion conveyor 90 according to the present invention. In the FIG. 3 embodiment, the pair of tray support members 18 are driven by a linear motor 95 which utilizes one or more plate-like linear motor stators 92 and one or more similar linear motor armatures 94, with each of the stators and armatures being manufactured so that the curve of the plate has a radius with a center spaced along the pivot axis 22. A similar linear motor 97 may be used to drive the counterweight 50, with this linear motor having a stator 98 secured to the base 12 at its ends 100 and 102, and an armature 104 secured to the top of the counterweight 50. The linear motor 95 thus reciprocates the support member 18 while the linear motor 97 reciprocates the counterweight 50. Counterweight 50 is supported on counterweight support member or arm 52, which pivots with respect to the base 12 about axis 54. The curved plate stator 98 and the curved plate armature 104 similarly have a radius with a center along the counterweight pivot axis 54. A left-side and a right-side counterweight support member 52 may be provided for pivotally supporting the counterweight 50 with respect to the base 12. When the tray or pan 16 moves in the forward direction, the counterweight 50 moves in the reverse direction, and when the tray 16 moves in the backward direction, the counterweight 50 moves in the forward direction. Again, the pivot connections between the support members 18, 20 and 52 about the respective pivot axes 22, 24 and 54 may be provided by rubber bushings.

Referring to FIG. 4, the curved plate armature 94 for the motor 95 is shown mounted to a cross piece 96 which interconnects the pair of pan support member 18. The counterweight supports 52 are not depicted in FIG. 5 since they are hidden by the tray support members 18. Each of the curved plate stators for the motors 95 and 97 may include sections spaced along the curvature of each plate to attract corresponding sections in the armature. Linear motors with plate-like stators and plate-like armatures are manufactured by Anand Corp. or Trilogy Systems Corp. The stators and armatures as shown in FIG. 3 may thus be specially manufactured to have the desired curvature so that the gap between each stator and the respective armature remains constant during reciprocation of the tray 16 or the counterweight 50.

FIG. 3 also illustrates that the triggering devices 56 and 60 as well as the respective position sensors 58 and 62 may be provided on the armature and the frame, respectively, for sensing the position of the counterweight 50. These triggering devices and sensors would thus functionally operate in the manner similar to the triggering devices and sensors previously discussed, and in one embodiment may be Hall effect sensors. Similar triggering devices and sensors may be provided on the armature and the stator of the motor which drives the tray, or alternatively may be provided on the armature of the motor driving the tray and the base 12. In yet another embodiment of the invention, the position sensors may be provided on any one of the tray supports 18, 20 or any one of the counterweight supports 52 and on the base 12. Although only shown for the embodiment in FIG. 3, it should thus be understood that position sensors may be provided for sensing the respective position of the armature with respect to the stator for any of the linear motors discussed herein.

FIG. 3 also depicts a forward stop 106 and a backward stop 108 each for limiting forward movement and backward movement of the tray, respectively. When the motor 95 is energized, the motor itself directly controls forward movement and backward movement of the tray support arms 18, and thus the forward travel and backward travel of the tray 16. When the motor 95 is inactive, the stops 106 and 108 thus ensure that the travel of the pan 16 is limited by engagement of the member 18 with one of the stops 106, 108, thereby ensuring that the tray does not drop below a selected height. Each of the stops 106 and 108 may be secured to the base 12 for engagement with one of the tray support arms 18, 20. Each stop may be adjustable within selected limits by a conventional threaded bolt arrangement. Although only shown for the FIG. 3 embodiment, it should be understood that similar stops may be used on all of the embodiments discussed herein. Also, the stops may be provided at various positions and may directly engage the support arms, the motor armatures, or the tray or counterweight, respectively.

FIG. 3 illustrates another feature of the counterweight 50 which, although only shown for the FIG. 3 embodiment, may also be used for any of the counterweights discussed herein. As shown in FIG. 3, the counterweight 50 includes a plurality of plates, which are simplistically depicted as plates 50A, 50B, and 50C, respectively. Each of these plates may be easily added and removed from the remaining weight of the counterweight by a conventional mounting arrangement, such as hooks, bolt supports 51, or other conventional supporting member. The weight of the counterweight may thus be easily varied by adding or deleting additional plates 50A, 50B and 50C to any end, side, or bottom of the counterweight assembly. This allows the weight of the counterweight assembly to easily match to the weight of the tray, so that the same basic counterweight assembly may be used for different sized trays, with the addition of plates 50A, 50B, and 50C for the heavier trays.

The embodiment as depicted in FIGS. 3 and 4 has significant advantages. Both the height and the size of the drive unit may be minimized so that, if desired, the tray 16 may be mounted closely adjacent the floor, with the tray support members 18 and 20 having a height of, e.g., 12 inches. The linear motor 95 is positioned directly between the pair of tray supports 18. By centering each of the linear motors 95 and 97 directly over the pivot points of the support member which that motor drives, the rigidity of the assembly and the accuracy of the drive units to reciprocate the tray or the counterweight are maximized. The tray 16 and the drive unit 95 are structurally independent, thereby allowing the tray to be formed as a simple sheet metal product without regard to the manufacture of the motor 95.

Each motor stator and armature as shown in FIGS. 3 and 4 may be formed from plates having a thickness of approximately ¼ inch, so that the cost of the drive unit is relatively low. The arrangement as shown in FIGS. 3 and 4 thus eliminates all linear bearings, thereby improving the reliability and useful life of the differential impulse conveyor. The mounting of the tray is simplified by the use of the pivotably tray support members 18 and 20, and the reliability of the mounting arrangement for these supports is ensured by the use of rubber bushings at each pivot location, as previously explained.

Another embodiment of the invention may include linear motors which are very similar to the linear motors 95 and 97, but in this case the stator plate and armature plate each have a flat plate configuration. Linear motors with flat plate stators and armatures are commercially available, and this embodiment thus may have a lower cost than the embodiment depicted in FIGS. 3 and 4. A disadvantage of utilizing flat plate stators and armature instead of the curved plate stators and armatures for the embodiment otherwise shown in FIGS. 3 and 4, however, is that as the tray and the counterweight reciprocate in the forward and backward directions, the armatures will rise and fall with each stroke because of the swing radius on the support or arm to which each respective armature is attached. This rising and falling thus changes the air gap between the flat plate stator and the flat plate armature, which adversely affects the efficiency of the linear motor. In some applications, however, the undesirable change in the air gap may not be a significant detriment. If the tray 16 is mounted closely adjacent the floor, the length of the support members 18 and 20 may each be 12 inches or less, as previously noted. For this embodiment, the rise or fall of the armature during a full 2 inch stroke of the pan should be less than 0.05 inches, which may be an acceptable air gap variation for this linear motor. The size of the air gap variation will of course depend on the vertical spacing between the lower pivotal support connection and the armature. For embodiments which utilize light pans and thus do not require a high efficiency linear motor, and for embodiments wherein the tray is mounted fairly close to the pivot connection 22, this alternate embodiment with flat plate linear motor stators and armatures may be practical.

Figure 5:
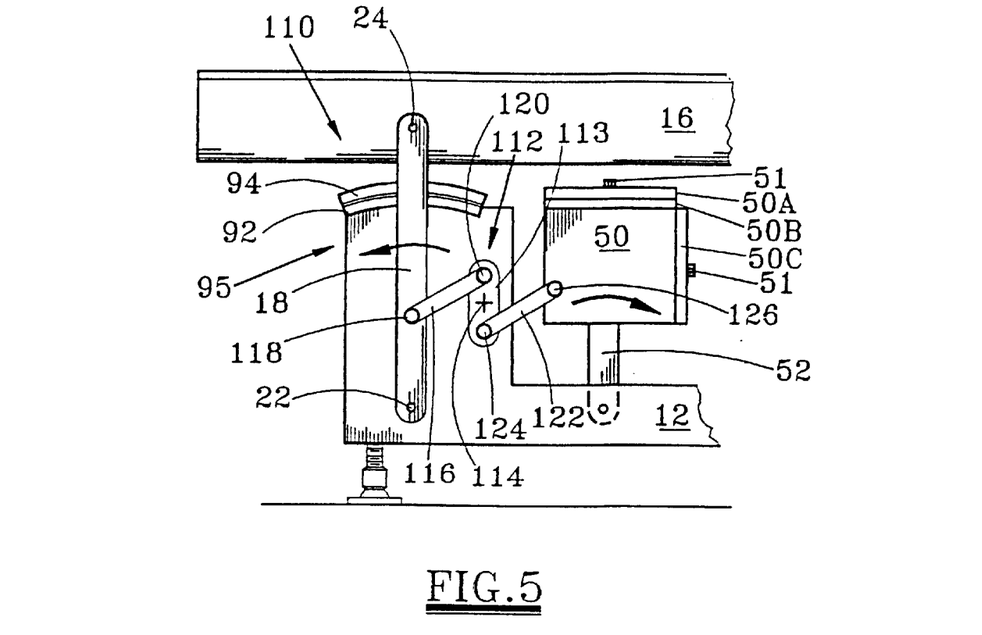
FIG. 5 is a side view of an alternate embodiment of a conveyor similar to the conveyor shown in FIGS. 3 and 4 but modified with a counterweight linkage.

FIG. 5 depicts another embodiment of a differential impulse conveyor which is similar to the FIG. 3 embodiment, although in this case the differential impulse conveyor 110 includes a single linear motor 95 which is used to drive both the tray 16 and the counterweight 50. The curved plate armature 94 of the motor 95 is thus connected to the pair of support members 18, as previously described. The counterweight 50 is mounted on a pair of rear support members 52 and a pair of front support members 53, as is the embodiment depicted in FIG. 8 discussed subsequently. In this embodiment, however, a linkage mechanism 112 interconnects the reciprocating arms 18 with the counterweight 50, so that a single linear motor may be used to simultaneously achieve forward movement of the tray during backward movement of the counterweight, and backward movement of the tray during forward movement of the counterweight. The reverse linkage mechanism 112 for this embodiment includes a link member 113 which is pivotally connected to the base 12 to oscillate about pivot point 114. Another link member 116 interconnects the arm 18 with the link member 113, with this link member 116 being pivotally connected to the arm 18 to rotate about axis 118, and pivotally connected to the link member 113 to rotate about axis 120. A similar link member 122 interconnects an opposing end of a link member 113 to the counterweight 50, with this link member 122 pivoting about axis 124 with respect to link member 113 and pivoting about axis 126 with respect to the counterweight 50. When the linear motor 95 drives the arm 18 in the backward direction, this backward motion rotates the link member 113 in a counterclockwise direction as shown in FIG. 5, thereby pushing the counterweight 50 in the forward direction. The use of the linkage mechanism 112 thus eliminates the expense of an additional linear motor, and further eliminates any problem associated with synchronization between two motors. Although not shown for the other embodiments depicted, it should be understood that a similar linkage mechanism may be used for each of the embodiments discussed herein which disclose one motor for driving the tray and another motor for driving the counterweight. Also, it should again be emphasized that, for some applications, the use of a counterweight may not be required.

Figure 6:
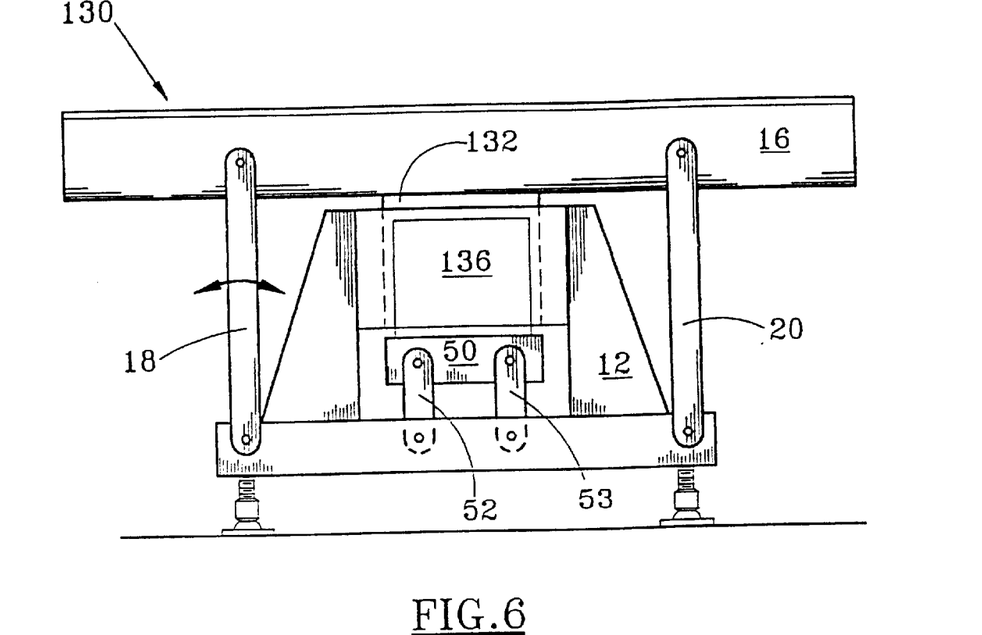
FIG. 6 is a side view of another embodiment of a differential impulse conveyor utilizing a motor having a flat plate armature and a flat plate stator.
Figure 7:
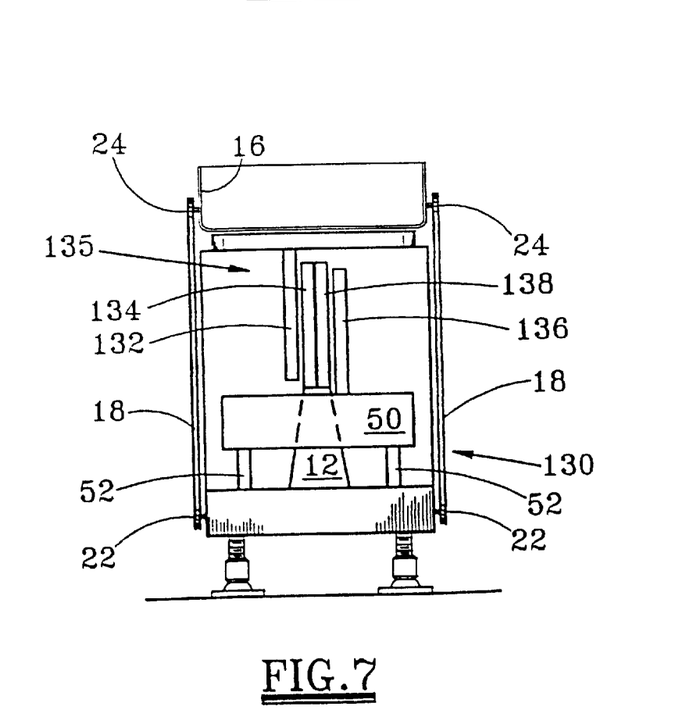
FIG. 7 is a right end view of the embodiment shown in FIG. 7.

FIGS. 6 and 7 depict yet another embodiment of a differential impulse conveyor 130 which utilizes linear motors each with flat plate stators and armatures. In this case, the linear motor 135 for driving the tray includes a flat plate armature 132 which is secured to the tray 16 such that the armature 132 moves substantially within a first vertical plane. The motor 135 includes a flat plate stator 134 fixed to the base 12 and aligned within a second vertical plane adjacent to but spaced horizontally from the first vertical plane. By vertically mounting the stator and the armature, the gap between the stator and armature during pivotal movement of the tray support arms 18 and 20 is not varied. The arrangement as shown in FIGS. 6 and 7 both eliminates the need for linear bearings, and allows for the use of a flat plate stator and armature without varying the gap between the stator and armature during operation of the motor. The relatively small vertical movement of the armature 132 with respect to the stator 134 does not vary the air gap between the armature 132 and the stator 138, and should have little effect on the operation and efficiency of the linear motor 135. A similar flat plate stator 138 and a flat plate armature 136 may be used to drive the counterweight 50, with the armature 136 being affixed to the counterweight 50. The armature 136 is positioned within a third vertical plane spaced horizontally from both the first and second vertical planes.

It should be noted that for each of the curved plate or flat plate linear motors, only one armature and one stator are shown for clarity, although the invention envisions the use of multiple armatures and corresponding multiple stators to achieve better motor performance, particularly for applications wherein the motor drives a large tray 16. Also, a motor could include a single stator and a pair of armatures on opposing sides of the stator, with one armature driving the tray and the other armature driving the counterweight.

Figure 8:
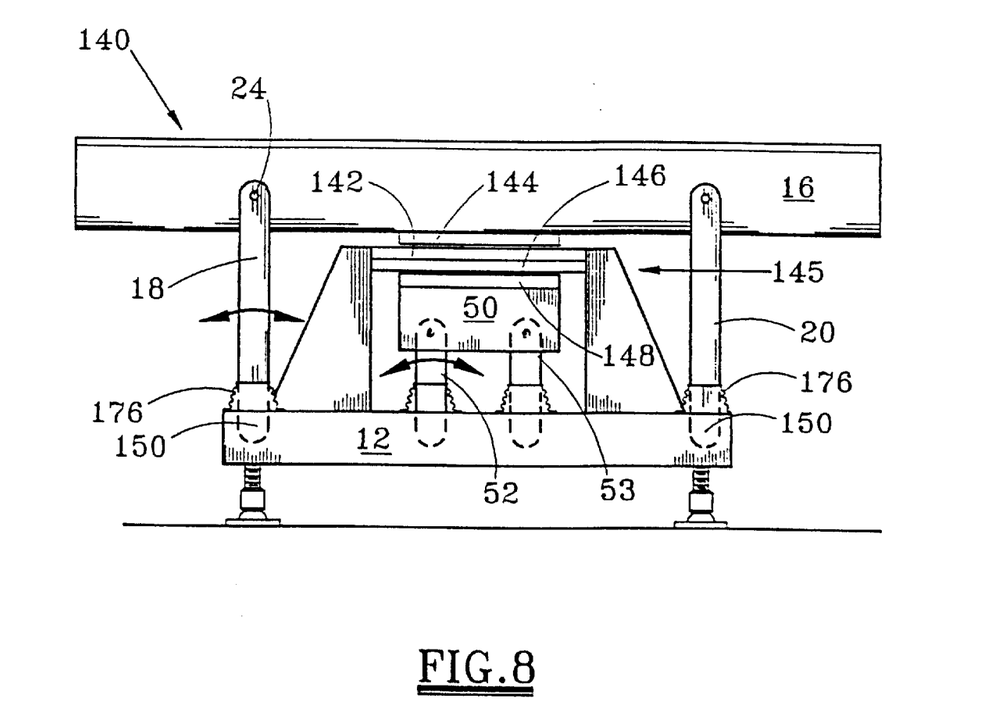
FIG. 8 is a side view of another embodiment of a differential impulse conveyor having a flat plate armature, a flat plate stator, and tray support members with lower linear bearings.

For the embodiment shown in FIGS. 6 and 7, the armature for the linear motor is fixedly connected to the tray 16, while for other embodiments discussed above, the armature for the linear motor is connected to one of the tray support members 18, 20 which pivotally interconnect the base 12 with the tray 16. It should be understood that, for many applications, it may be advantageous to interconnect the armature to one of the tray support members rather than to the tray, so that the manufacture and replacement of the tray is independent of the linear motor. In other cases, however, the armature may be fixed directly to the tray rather than to one of the tray support members 18 and 20. This latter arrangement is particularly well suited for the embodiment shown in FIGS. 6 and 7, as well as the embodiment shown in FIG. 8 discussed subsequently, each of which use a flat plate linear armature and a corresponding stator. For the embodiments as shown in FIGS. 6–8, however, the flat plate armatures alternatively could be mounted to one of the tray support members. Similarly, for the other embodiments depicted wherein the armature is attached to a tray support member, the armature could be attached directly to the tray rather than the tray support member, although those latter embodiments would not be preferred for many applications.

FIG. 8 depicts yet another embodiment of a differential impulse conveyor 140 which utilizes a linear motor 145 having a flat plate stator 142 and a flat plate armature 144. The flat plate stator 142 is secured to the base 12, while the flat plate armature 144 is secured to the tray 16. Also, a corresponding flat plate stator 146 is secured to the base 12 and a flat plate armature 148 is secured to the counterweight 50 to drive the counterweight 50, as previously described. The tray 16 is supported by tray supports 18 and 20 which are each pivotally connected at 24 to the tray 16. The counterweight 50 includes four support members 52, 53 each also pivotally connected to the counterweight 50. For the FIG. 8 embodiment, the desired constant air gap between the stator and the armature is obtained by utilizing a special linear bearing 150 at the lower end of the support members 18, 20, 52 and 53. As explained subsequently, this linear bearing 150 thus allows the tray and the counterweight to be reciprocated by the respective motor without changing the air gap between the motor stator and the motor armature, and also allows the overall height of the conveyor to be significantly reduced.

Figure 9:
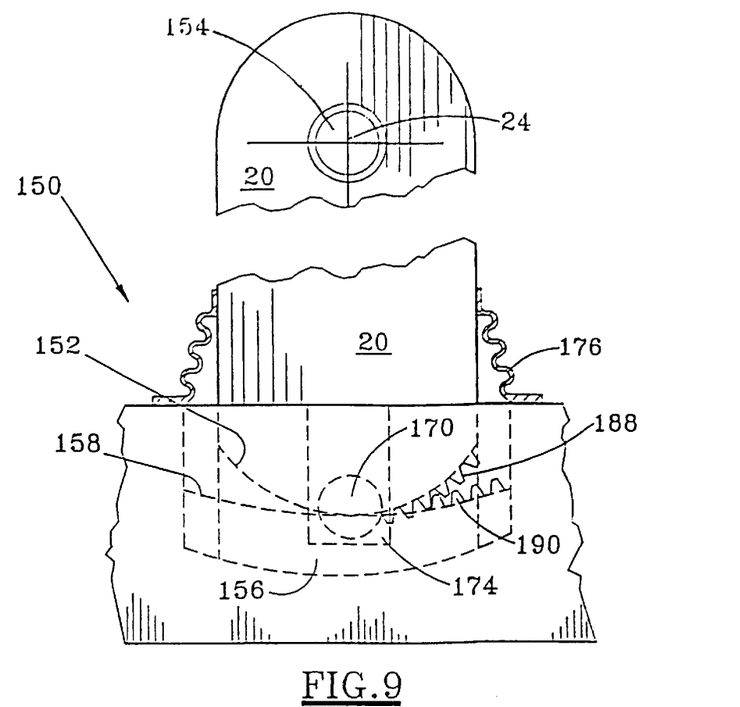
FIG. 9 is a detailed end view of a tray support or other connector with a lower linear bearing as generally shown in FIG. 8.
Figure 10:
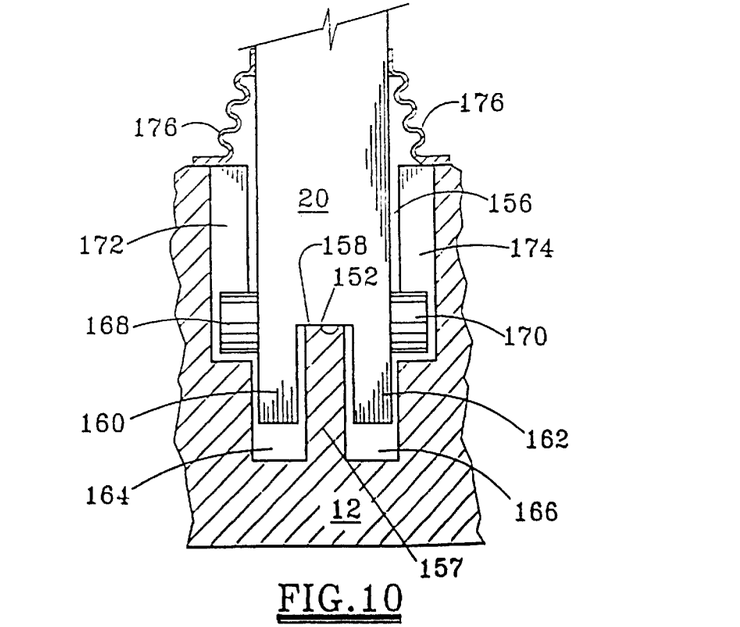
FIG. 10 is a side view of the lower linear bearing shown in FIG. 9.

FIGS. 9 and 10 illustrate in further detail the linear bearing 150 used in conjunction with one of the tray support members 20. The tray support member 20 is provided with a pin 154 which interconnects the tray support member 20 with the tray 16, and which allows pivoting rotation of the tray support member 20 with respect to the pan about axis 24. The lower end of the tray support member 20 is provided with a curved end surface 152, with this curved end surface 152 having a selected radius such that its center coincides with the pivot axis 24. The base 12 has a pocket 156 therein for receiving the lower end of the tray support member 20, and a curved contact surface 158 is provided for engagement with the curved end surface 152. In accordance with the present invention, the curved contact surface 158 has a radius which is twice the radius of the end surface 152, with the center of this radius being spaced directly above the axis 24 for the embodiment shown in FIG. 9. As previously noted, the tray 16 may be moved in a purely horizontal manner during reciprocation of the tray support members 18, 20 by the linear motor in order to avoid a changing air gap between the motor stator and armature. The linear bearing 150 as shown in FIG. 9 accomplishes this result by ensuring that the end surface 152 rocks slightly back and forth along the contact surface 158, but the controlled radius of these contact surfaces ensures that during this rocking action the pivot axis 24 moves horizontally back and forth, and not in an arcuate path. This desired result is achieved when the surface 152 rocks back and forth on the contact surface 158, and would not be achieved if these surfaces were in sliding engagement. Accordingly, FIGS. 9 and 10 depict two arrangements to ensure that no sliding action occurs between the end surface 152 and the contact surface 158. Under one arrangement, the pair of guide ears or pins 168 and 170 extend outward from the left and right sides of the support member 20. Each of these pins move within a respective slot 172, 174 affixed in the base 12, with this slot having a central axis aligned with the pivot access 24. As the support arm 20 rocks slightly back and forth on a contact surface 158, the extending pins 168 and 170 are guided by the respective slots 172 and 174 to ensure that these pins can only move in a direction linearly toward the pivot axis 124. A horizontal centerline of the pins 168 and 170 passes through the point of engagement of the surfaces 152 and 158 to ensure straight line linear motion of the axis 24. Accordingly, this guiding function served by the pins and slots ensures that the end surface 152 will not be allowed to slide along the contact surface 158.

The lowermost ends 160 and 162 of the support member 20 thus straddle the contact surface 158 and rock within the respective pocket 164 and 166 as shown in FIG. 10. These lower ends 160 and 162 provide support for the pins 168 and 170, although other arrangements could be provided. By straddling the central support 157 which includes the contact surface 158, these lower ends 160 and 162 thus prevent any undesirable movement of the support arm to the right or to the left as shown in the FIG. 10 view.

FIG. 9 discloses another arrangement for ensuring that undesirable sliding between the end surface 152 and the contact surface 158 does not occur. For this embodiment, the ears in the slots may be eliminated, and instead both the end surface 152 and the contact surface 158 may be provided with inter-engaging teeth 188 and 190, respectively. The mating engagement of these teeth allow for the slight rocking action necessary to accomplish the purposes of the invention, and effectively prevent any undesirable sliding of these surfaces. These inter-engaging teeth may be formed as conventional gear teeth on the end surfaces, or alternatively one of the gear teeth may be replaced with a section of a timing belt rigidly secured to that surface, with the teeth and the timing belt designed to engage corresponding teeth on the opposing end surface or on a mating timing belt. Although these teeth may be used to prevent undesirable sliding movement of the surface 152 with respect to the surface 158, the centerline contour of these teeth nevertheless define a curved surface which, as explained above, satisfies the relationship wherein the centerline of the teeth for the end surface 152 coincides with the pivot axis 124, and the centerline for the teeth 190 on the surface 158 has a radius twice that of the surface 152. Also, those skilled in the art should appreciate that the radius for the surfaces 152 and 158 depicted in FIG. 9 are for a very short support arm for clarity of the concept, and that when used as a linear bearing for supporting a tray of a differential impulse conveyor, these surfaces typically would have a radius substantially greater than that shown in FIG. 9.

FIGS. 9 and 10 also depict an arrangement to eliminate the debris from entering the pocket 156 which receives a lower end of the tray support member 20. Accordingly, a conventional bellows 176, which may be made from a rubber-like material, may be secured at one end or four sides of the tray support member 20, and secured at the other end to the base 12. The bellows 176 thus prevents material from entering the pocket 156 for receiving the lower end of the support member 20.

Figure 11:
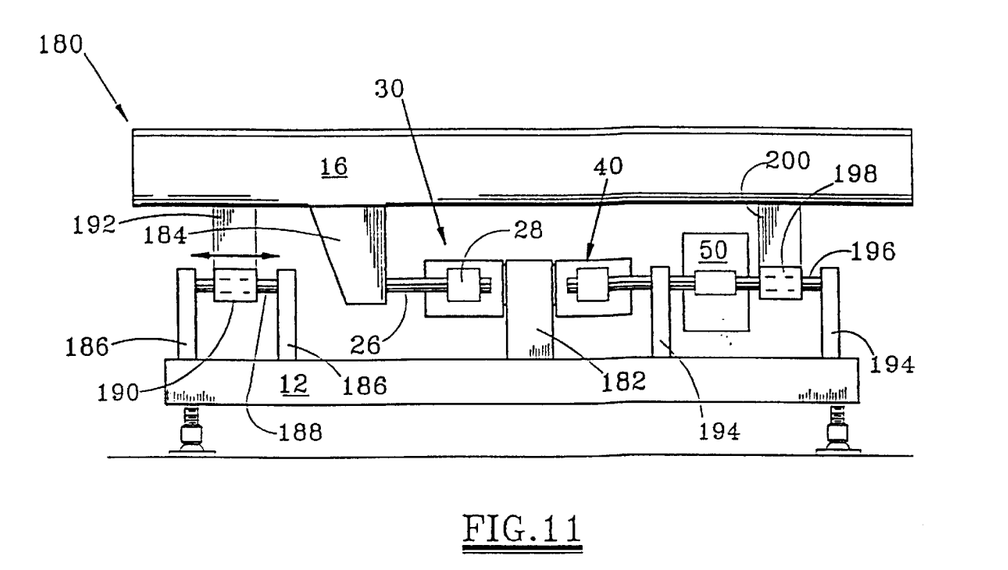
FIG. 11 is a side view of another embodiment of a differential impulse conveyor with a linear motor having an armature circumferentially surrounding a reciprocating shaft and utilizing conventional linear bearings to support the tray.
Figure 12:
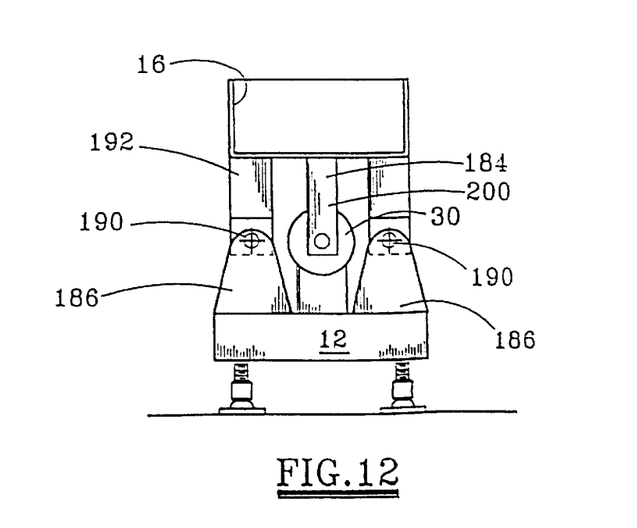
FIG. 12 is a left end view of the differential impulse motion conveyor shown in FIG. 10.

FIGS. 11 and 12 depicting another embodiment of a differential impulse conveyor 180 according to the present invention. For this embodiment, the tray 16 is driven directly by a round linear motor 30 as previously discussed, with the plunger or armature 26 being connected directly to a bracket 184, which is fixed to the tray 16. Similarly, the round linear motor 40 is directly connected to the counterweight 50. The stators of both the motors 30, 40 may be secured to the center support 182 which is fixed to the base 12. The tray 16 is supported by two rearward arms 192 and two similar forward arms 200. The rearward arms 192 are each mounted on a conventional linear bearing 190 to slide along fixed shaft 188, which is supported by the spaced apart supports 186 secured to the base 12.

Each of the tray supports 200 is similarly supported on a linear bearing 198 which slides along the fixed shaft 196.

Each shaft 196 is supported at its forward end by a vertical support 194 each secured to the base 12. As shown in FIG. 11, both the counterweight 50 and the linear bearing 198 may optionally be spaced between the pair of vertical supports 194. As shown in FIG. 12, each of the linear motors 30 and 40 may be centrally spaced between the tray support members 192.

Each of the linear bearings in the motors 30 and 40 may be of the type conventionally provided in round linear motors, or alternatively may be special linear bearings designed for more rugged application. The bearings 190 and 198 for the tray supports may also be conventional linear bearings, and may either be the type which utilizes a brass bushing or a ball bearing construction. Suitable linear bearings 190, 198 may be of the type manufactured by Thompson Industries, Inc. in Port Washington, N.Y.

Figure 13:
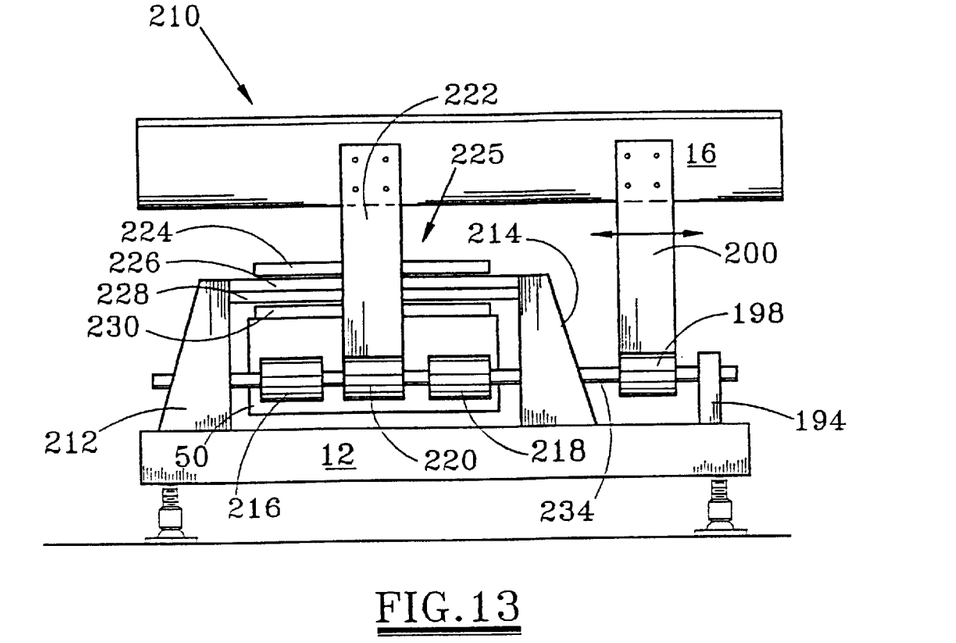
FIG. 13 is another embodiment of a differential impulse conveyor with a motor having a flat plate armature and flat plate stator, and with conventional linear bearings supporting the tray.

One of the advantages of the embodiment shown in FIGS. 12 and 13 is that the tray 16 may be mounted closely adjacent the floor, since the drive mechanism requires very little height or space. The disadvantage of this embodiment, however, is the use of numerous linear bearings both in the drive motor and for the tray and counterweight supports. Commercially available linear bearings may not have the desired long life as do the rubber bushings which preferably replace the linear bearings when the supports are pivotally mounted. Even if linear bearings can be obtained with this enhanced life, it is believed that the cost of the linear bearings which will achieve a life comparable to that of the rubber bushings as disclosed herein will be significantly greater than the cost of the rubber bushings.

For the embodiment shown in FIGS. 11 and 12, the tray connected member for interconnecting the linear motor and the tray is simply a bracket 184 which is secured to the tray 16, and is also secured to the armature of the linear motor. For other embodiments as discussed herein, the tray connect member which interconnects the tray 16 and the linear motor may include one or more of the tray support members 18, 20 which in turn are pivotally connected to at least one end to base 12 or the tray 16. For other embodiments as discussed herein, the armature may be fixed directly to the tray, in which case the only tray connect member which interconnects the linear motor to the tray is the securing member which attaches the motor armature to the tray. Those skilled in the art will appreciate that various bracket, clevis or arm arrangements may be utilized for interconnecting the armature of a linear motor to the tray 16.

Figure 14:
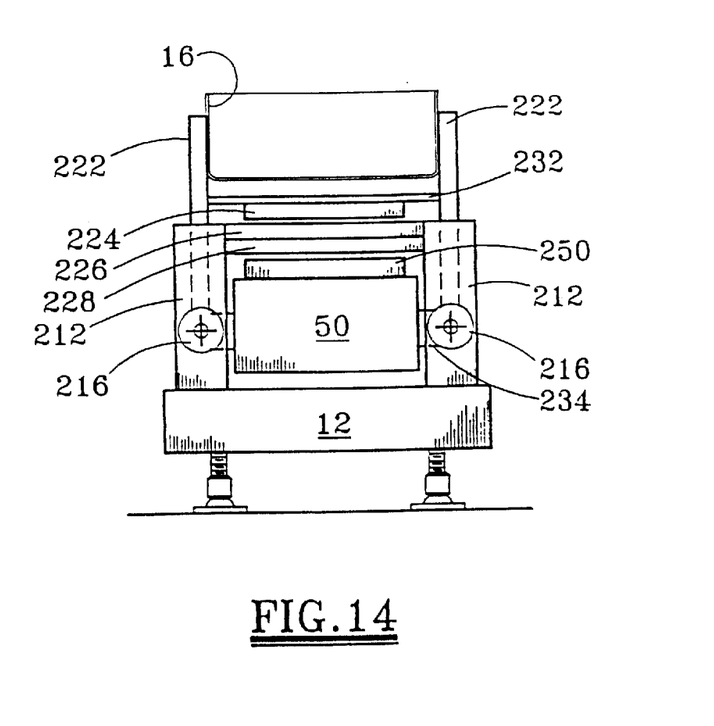
FIG. 14 is a left end view of the differential impulse conveyor shown in FIG. 13.

FIGS. 13 and 14 depict yet another embodiment of a differential impulse conveyor 210 according to the present invention. This embodiment utilizes a flat plate linear motor 225 having a stator 226 secured to the spaced uprights 212 and 214, each affixed to the base 12. The flat plate armature 224 for the drive motor 225 is secured to the crosspiece 232 which extending between the tray support members 222. The motor for driving the counterweight 50 includes a stator 228 also fixed to the supports 212,214, and a flat plate armature 230 secured to the top of the counterweight 50. Another cross member 234 extends between the linear bearings 216 and between the linear bearings 218 to support the counterweight 50. A pair of fixed shafts 234 each extend between the supports 212,214, and then continues on to be supported by a respective forward support 194. Each of the linear bearings 216, 220, 218 and 198 is thus linearly movable along a respective shaft 234 during operation of the differential impulse conveyor 210. Use of these linear bearings avoids the problem with the varying air gap between the flat plate stators and the flat plate armatures, but as previously noted introduces the additional factors of cost and poor service life for the use of linear bearings.

A particular advantage of the embodiment shown in FIGS. 13 and 14 is the use of a linear motor with a flat plate stator and armature, with each of the stator and armature being centered over linear bearings 220 to provide high rigidity and to precisely locate the armature with respect to the stator. The motor for driving the tray 16, and particularly the motor armature 224, is connected to either the tray 26 or is connected to at least one of the tray support members 222. The linear bearing 220 is positioned horizontally in line with the linear motor (in a direction of movement of the goods along the elongate tray) such that the center of gravity of the armature 224 is vertically in line with (directly over for the embodiment shown) the linear bearing 220. This spacing of the motor armature and the linear bearing increases the likelihood of maintaining a substantially constant air gap between the linear motor stator and the linear motor armature. If the motor armature 224 is connected to one of the pair of tray support members, then that member, e.g., 222, is also vertically in line with the armature. This vertical alignment of the tray support member 222, the linear bearing 220 and the linear motor thus contribute to the long service life of the conveyor and also to the high efficiency of the linear motor.

As shown in FIG. 14, tray armature 224 may be attached to the crosspiece 232 extending between the pair of tray support members 222 and thus between the pair of linear bearings 220. Accordingly, the linear motor for this embodiment has a benefit of being structurally separate from the tray, thereby allowing the drive unit and the tray to be manufactured and replaced as separate components. A significant advantage of the embodiment shown in FIGS. 13 and 14 is the reduced overall height of the drive unit, which is achieved by the use of the flat plate linear motor and the linear bearing. The tendency of a flat plate stator and a flat plate armature to pull together during operation of the motor is thus reduced by providing the supports 222 and the linear bearings 220 centered with respect to the flat plate stator and the flat plate armature. If desired, additional linear bearings (not shown) may be used between the armature and stator to maintain the constant air gap between the flat plate stator and the respective flat plate armature.

Linear bearings 150 as discussed herein may thus be used in conjunction with the tray support members 18, 20 and the armature support members 52, 53. In a less preferred embodiment, it should be understood that each of these support members may be pivotally connected at a lower end to the base 12, with the linear bearing 150 as shown in FIGS. 9 and 10 then used to interconnect the upper end of each support member with the tray 16 or the counterweight 50, respectively. According to another aspect of the invention, however, the linear bearing as discussed herein has utility apart from its use with differential impulse conveyors. The linear bearing concept of the present invention may thus be employed in various applications, and in particular in applications such as robotics and machine tool operations which provide a connector pivotally connected at one end, with the desire that the movable member connected thereto move linearly in a straight line rather than in an arcuate path. Other devices which may benefit from the improved linear bearing of this invention include sewing machines, reciprocating saws (jig, saber, or hack), jack hammers, reciprocating motors, drill presses, industrial punches and forming machines. The typical linear bearing now used in many of these devices consists of a bushing, commonly fabricated from brass, nylon, or Teflon™, mounted in a stationary housing with a reciprocating shaft passing through the bushing to provide location and alignment for the reciprocating shaft. This sliding arrangement wears the bushing which limits its useful life. Despite this limitation, the low initial cost of such a bushing makes it suitable for many applications. When longer life, greater load capacity and greater accuracy is required, the linear bearings as disclosed herein will have application and utility. The improved linear bearing provides advantages in at least these three areas due to its rolling, rather than sliding motion: (1) reduced wear, (2) larger contact area and thus larger load capability, and (3) metal to metal location for high accuracy. Depending on the application, a plurality of linear bearings as disclosed herein may accordingly be positioned circumferentially about each end of a reciprocating shaft, such as a linear motor shaft, to provide the desired alignment of the shaft during its movement with respect to the stationary member.

Accordingly, the invention as shown in FIGS. 9 and 10 envisions a connector for interconnecting any stationary member with a movable member, with the movable member being linearly movable relative to the stationary in response to a forward and reverse movement of the connector relative to the stationary member. The pivot thus interconnects one end of the connector with either the stationary member or the movable member such that the connector pivots about a pivot axis fixed relative to the connector. In the FIG. 9 embodiment, the connector is a support which pivots about the axis 24 which is fixed relative to the movable member, although for other applications the pivot may interconnect the connector with the fixed member so that the connector pivots about the pivot axis fixed relative to both that end of the pivot and the fixed member. The opposing end of the connector thus includes a curved end surface having a radius with a center which lies along the pivot axis. A contact surface is secured to the other of the stationary member and the movable member and serves as an engagement surface for the end surface. As disclosed herein, this contact surface has a radius twice the radius of the end surface, with the contact surface center being spaced along a line which interconnects the engagement point between the contact surface and the end surface and the pivot axis. This 1:2 ratio of the radius for these contacting surfaces, when combined with a mechanism to ensure that no sliding of the end surface occurs with respect to the contact surface, thus ensures that linear movement of the movable member relative the stationary member will be obtained. This linear bearing thus avoids the arcuate movement of the movable member with respect to the stationary member which otherwise would occur of the connector pivotally connected both the stationary member and the movable member. Those skilled in the art will appreciate that the terms "stationary member" and "movable member" are used in a relative sense in that the movable member reciprocates relative to the stationary member. The stationary member, in turn, may truly be stationary or alternatively may itself move while still being stationary relative to the movable member. A guide as disclosed in FIGS. 9 and 10 may thus be provided for guiding relative motion between the curved end surface with respect to the curved contact surface, or alternatively both the curved end surface and the curved contact surface may have inter-engaging teeth for preventing such sliding movement.

As previously noted, the use of a counterweight in the differential impulse conveyor is optional. For other applications, and particularly for applications wherein the tray is quite large and thus heavy, more than one counterweight may be provided. If more than one counterweight is provided, a movement of each counterweight with respect to the movement of the tray desirably may be staggered in accordance with the disclosure of U.S. Pat. No. 5,794,757. Each counterweight may be provided with its own linear drive motor. Alternatively, the drive motor for the tray may also drive each of the two or more counterweights. In yet another embodiment, one linear motor is provided for driving the tray, and one linear motor is provided for driving each of the two or more counterweights.

The term "base" as used herein is intended in its general sense to mean the stationary member for supporting the tray supports, which in turn support the tray. The base as shown herein may be simply supported by the floor. The base could alternatively be hung from the ceiling by rods extending upward past the tray. The base nevertheless serves the function and purpose described herein.

Various other modifications to the differential impulse conveyor and to the method of powering the conveyor as disclosed herein will be apparent from the above description of the preferred embodiments. Various further modifications to the connector which provides a linear bearing will also be suggested from this description. Although the invention has thus been described in detail for various embodiments, it should be understood that this is for illustration, and the invention is not limited to the described embodiments. Alternate components and operating techniques will be apparent to those skilled in the art in view of this disclosure. Additional modifications are thus contemplated and may be made without departing from the spirit of the invention, which is defined by the following claims.

What is claimed is:

1. A differential impulse conveyor for moving goods, comprising:
   a conveyor base;
   a tray having a tray floor supporting the goods, the tray being movable in a forward direction to move goods forward during the tray forward movement, and movable in a backward direction to slide goods along the tray during tray backward movement;
   at least one tray support member interconnecting the conveyor base and the tray;
   an electrically powered linear motor to move the tray in the forward direction and in the backward direction, the linear motor having an armature movable with respect to a stator in a reciprocating manner, the stator connected to the base, and the armature connected to one of the tray and the at least one tray support member and having a curved central armature axis for moving in an arc with respect to the stator.

2. The differential impulse conveyor as defined in claim 1, wherein the central axis of the armature has a substantially constant radius having a center aligned with a pivot of the at least one tray support member.

3. The differential impulse conveyor as defined in claim 1, wherein the electrically powered linear motor comprises:
   a curved plate stator connected to the base; and
   a curved plate armature connected to the one of the tray and the at least one tray support member.

4. The differential impulse conveyor as defined in claim 1, further comprising:
   a counterweight movable with respect to the base in a backward direction during forward movement of the tray and in a forward direction during backward movement of the tray; and
   another linear motor for a moving the counterweight.

5. The differential impulse conveyor as defined in claim 1, further comprising:
   a counterweight movable with respect to the base in a backward direction during forward movement of the tray and in a forward direction during backward movement of the tray; and
   a linkage mechanism interconnecting the linear motor and the counterweight.

6. The differential impulse conveyor as defined in claim 1, further comprising:
a pair of tray support members interconnecting the conveyor base and the tray, each tray support member being moveable with respect to the base and secured to a tray.

7. The differential impulse conveyor as defined in claim 1, further comprising:
the stator including an electrical coil positioned circumferentially about the armature such that the stator passes through the armature to move the armature in a reciprocating manner.

8. A differential impulse conveyor for moving goods, comprising:
a conveyor base;
a tray having a tray floor supporting the goods, the tray being movable in a forward direction to move goods forward during the tray forward movement, and movable in a backward direction to slide goods along the tray during tray backward movement;
at least one tray support member interconnecting the conveyor base and the tray;
an electrically powered linear motor to move the tray in the forward direction and in the backward direction, the linear motor having a curved plate armature movable with respect to a curve plate stator in a reciprocating manner, the curved plate stator connected to the base, and the curved plate armature connected to one of the tray and the at least one tray support member.

9. The differential impulse conveyor as defined in claim 8, wherein the curved plate armature has a curved central armature axis for moving in an arc with respect to the curved plate stator.

10. The differential impulse conveyor as defined in claim 9, wherein the central axis of the armature has a substantial constant radius having a center aligned with a pivot axis of the at least one tray support member.

11. The differential impulse conveyor as defined in claim 8, further comprising:
a counterweight moveable with respect to the base in a backward direction during forward movement of the tray and in a forward direction during backward movement of the tray; and
another linear motor for a moving the counterweight.

12. The differential impulse conveyor as defined in claim 8, further comprising:
a counterweight movable with respect to the base in a backward direction during forward movement of the tray and in a forward direction during backward movement of the tray; and
a linkage mechanism interconnecting the linear motor and the counterweight.

13. The differential impulse conveyor as defined in claim 8, further comprising:
a pair of tray support members interconnecting the conveyor base and the tray, each tray support member being moveable with respect to the base and secured to a tray.

14. A differential impulse conveyor for moving goods, comprising:
a conveyor base;
a tray having a tray floor supporting the goods, the tray being movable in a forward direction to move goods forward during the tray forward movement, and movable in a backward direction to slide goods along the tray during tray backward movement;
at least one tray support member interconnecting the conveyor base and the tray;
an electrically powered linear motor to move the tray in the forward direction to move goods forward during tray forward movement and in the backward direction to slide goods along the tray during backward tray movement, the linear motor having an armature movable with respect to a stator in a reciprocating manner, one of the stator and armature connected to the base, and the other of the stator and armature connected to one of the tray and the at least one tray support member;
a counterweight movable with respect to the base in a backward direction during forward movement of the tray and in a forward direction during backward movement of the tray; and
one of another linear motor and a linkage mechanism interconnecting the linear motor and the counterweight for moving the counterweight.

15. A differential impulse conveyor as defined in claim 14, wherein the another linear motor moves the counterweight.

16. A differential impulse conveyor as defined in claim 14, wherein the linkage mechanism interconnects the linear motor and the counterweight and moves the counterweight.

17. A differential impulse conveyor as defined in claim 14, further comprising:
the motor stator is fixed to the base; and
the motor armature is fixed to the at least one tray support member.

18. The differential impulse conveyor as defined in claim 14, further comprising:
a curved plate stator connected to the base; and
a curved plate armature connected to the one of the tray and the at least one tray support member.

19. The differential impulse conveyor as defined in claim 14, wherein each of the stator and the armature comprises one or more flat plates stators and one or more flat plate armatures, respectively.

20. The differential impulse conveyor as defined in claim 19, wherein each of the one or more flat plate armatures moves in a substantially vertical plane with respect to the one or more flat plate stators.

21. The differential impulse conveyor as defined in claim 19, wherein each of the one or more flat plate armatures move in a substantially horizontal plane with respect to the one or more flat plate stators.

22. The differential impulse conveyor as defined in claim 14, further comprising:
the stator including an electrical coil positioned circumferentially about the armature such that the stator passes through the armature to move the armature in a reciprocating manner.

23. The differential impulse conveyor as defined in claim 14, further comprising:
a pair of tray support members interconnecting the conveyor base and the tray, each tray support member being moveable with respect to the base and secured to the tray.

24. The differential impulse conveyor as defined in claim 23, further comprising:
a pair of linear bearings each for guiding linear motion of a respective tray support member with respect to the conveyor base.

25. The differential impulse conveyor as defined in claim 24, further comprising:
one of the pair of linear bearings being positioned horizontally in line with the linear motor such that a center of gravity of the armature is vertically in line with the corresponding one of the linear bearings.

* * * * *